US007376972B2

(12) United States Patent
Konersmann et al.

(10) Patent No.: US 7,376,972 B2
(45) Date of Patent: May 20, 2008

(54) SESSION KEY EXCHANGE KEY

(75) Inventors: Scott A Konersmann, Sammamish, WA (US); Patrick J Helland, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/824,161

(22) Filed: Apr. 14, 2004

(65) Prior Publication Data
US 2005/0232426 A1 Oct. 20, 2005

(51) Int. Cl.
*G06F 17/30* (2006.01)
(52) U.S. Cl. .............................. 726/26; 726/3; 726/30
(58) Field of Classification Search ................. 726/26, 726/27, 29, 3, 30
See application file for complete search history.

(56) References Cited

U.S. PATENT DOCUMENTS

| | | | |
|---|---|---|---|
| 5,689,565 | A | 11/1997 | Spies et al. |
| 5,790,677 | A | 8/1998 | Fox et al. |
| 6,134,658 | A | 10/2000 | Multerer et al. |
| 2002/0049900 | A1 | 4/2002 | Patrick |
| 2003/0016653 | A1 | 1/2003 | Davis |
| 2003/0021416 | A1 | 1/2003 | Brown et al. |
| 2003/0074579 | A1 | 4/2003 | Della-Libera et al. |
| 2003/0194093 | A1 | 10/2003 | Evans et al. |
| 2003/0208677 | A1 | 11/2003 | Ayyagari et al. |
| 2003/0217288 | A1 | 11/2003 | Guo et al. |
| 2003/0226017 | A1 | 12/2003 | Palekar et al. |

OTHER PUBLICATIONS http://msdn.microsoft.com/msdnmag/issues/03/07/DesignPatterns/.*
http://tools.ietf.org/id/draft-ietf-sip-session-timer-10.txt.*
http://tools.ietf.org/html/draft-ietf-sip-rfc2543bis-09, section 26.*
(http://www.microsoft.com/presspass/exec/flessner/04-11flessnerteched.mspx.*
http://www.ietf.org/rfc/rfc3325.txt.*

(Continued)

*Primary Examiner*—David Jung
(74) *Attorney, Agent, or Firm*—Amin, Turocy & Calvin, LLP

(57) ABSTRACT

A system and method for employing a key exchange key to facilitate secure communication is provided. The key exchange key can be employed, for example, to encrypt and/or decrypt dialog session key(s) that are used to encrypt and/or decrypt message(s) that form a dialog between an initiator system and target system. In one example, a key exchange key is unique to a service pair, while a dialog session key is unique to a particular dialog between the service pair. The system can facilitate end-to-end encryption of message data in a dialog—the message data is encrypted at one dialog endpoint and not decrypted until it reaches the other dialog endpoint. The system can be employed to facilitate secure dialog with minimal performance overhead when compared with conventional system(s). Optionally, the system can facilitate load balancing (e.g., among deployed instances of a service). In this example, secured dialogs to a service can be location transparent so that a dialog targeted to a service can be able to talk to any instance of the same service transparently without any additional security setup. The system employs both public key/private key asymmetric encryption technique(s) and symmetric encryption technique(s) to authenticate and secure information exchanged between an initiator system and a target system.

34 Claims, 8 Drawing Sheets

OTHER PUBLICATIONS

Method to implement packet level access control in multinetworks Poon, F.S.F.; Iqbal, S.M.; Electronics Letters vol. 25, Issue 25, Dec. 7, 1989 pp. 1742-1744.*

The implication of the security key exchange during mobile IPv6 smooth handoff Tin-Yu Wu; Ting-Shi Tsai; Han-Chieh Chao; Advanced Communication Technology, 2005, ICACT 2005. The 7th International Conference on vol. 2, 0-0 0 pp. 965-970.*

The final nail in WEP's coffin Bittau, A.; Handley, M.; Lackey, J.; Security and Privacy, 2006 IEEE Symposium on May 21-24, 2006 p. 15 pages.* http://msdn.microsoft.com/msdnmag/issues/03/07/DesignPatterns/, printed year 2007.* http://tools.ietf.org/id/draft-ietf-sip-session-timer-10.txt, printed year 2007.* http://tools.ietf.org/html/draft-ietf-sip-rfc2543bis-09, section 26, printed year 2007.* http://www.microsoft.com/presspass/exec/flessner/04-11/flessnerteched.mspx, printed year 2007.* http://www.ietf.org/rfc/rfc3325.txt, printed year 2007.*

U.S. Appl. No. 10/824,162, filed Apr. 14, 2004, Scott A. Konersmann et al.

Emmanuel Bresson, et al., Provably Authenticated Group Diffie-Hellman Key Exchange, CCS'01, 2001, pp. 255-264, Philadelphia, Pennsylvania, USA.

Alain Mayer, et al., Secure Protocol Transformation via "Expansion": From Two-party to Groups, CCS '99, 1999, pp. 83-92, Singapore.

Maurizio Kliban Boyarsky, Public-key Cryptography and Password Protocols: The Multi-User Case, CCS'99, 1999, pp. 63-72, Singapore.

Yuliang Zheng, et al., Compact and Unforgeable Key Establishment over an ATM Network, Monash University, 1998, 8 pages.

http://www.microsoft.com/presspas/exec/flessner/04-11flessnerteched.mspx,year 2002.

http://tools.ietf.org/html/draft-ieft-sip-rfc2543bis-09, section 26, year 2002.

http://www.verisign.com/wss/WS-SecureConversation.pdf, Dec. 18, 2002.

* cited by examiner

SESSION KEY EXCHANGE KEY

CROSS-REFERENCE TO RELATED APPLICATIONS

This application is related to co-pending U.S. utility application No. 10/824,162 filed on Apr. 14, 2004, entitled UNILATERAL SESSION KEY SHIFTING, the entirety of which is incorporated herein by reference.

TECHNICAL FIELD

The present invention relates generally to computer system(s), and more particularly to systems and methods to facilitate secure exchange of information between service brokers.

BACKGROUND OF THE INVENTION

Computer network(s) have revolutionalized many aspects of modern life. Businesses are able to connect to one another's computer networks to, for example, retrieve information and/or even store information. However, with this freedom comes risk, such as, the ability of unauthorized user(s) retrieving and/or modifying information stored on a computer network.

Security frameworks have been developed to protect data transmitted in distributed computing systems. Conventional security frameworks have an assortment of degrees of privacy, security, adaptability and scalability. For example, the Kerberos system provides secure communications by users sharing a key with a third party. In order to conduct secure communications, each party connects to the third party and utilizes the key issued by the third party. Among other disadvantages, the Kerberos system allows the third party to track the identities of users who are communicating with each. Furthermore, the third party has the ability to decrypt messages because the third party issues the keys. The Kerberos security model is fixed; that is, administrators have limited flexibility in deployment options.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for system(s) and method(s) of employing a key exchange key to facilitate secure communication. A "key exchange key" can be, for example, a symmetric key. The key exchange key can be employed, for example, to encrypt and/or decrypt dialog session key(s) that are used to encrypt and/or decrypt message(s) that form a dialog between an initiator system and target system. In one example, a key exchange key is unique to a service pair, while a dialog session key is unique to a particular dialog between the service pair.

In accordance with an aspect of the present invention, a secure message generation system is provided. The system can be employed to facilitate a secure transfer of message(s) between two endpoints. The system can facilitate end-to-end encryption of message data in a dialog—the message data is encrypted at one dialog endpoint and not decrypted until it reaches the other dialog endpoint.

Additionally, the system can further facilitate:

Dialog Authentication: One or both endpoints of a conversation can verify the authenticity of the other endpoint;

Authorization Access Control: Can be imposed on authenticated users to ensure that only authorized actions (send, receive and enqueue) can be performed; and/or, Message integrity check (MIC): A MIC that covers the message body as well as certain header(s) can be sent with a message so that the receiving endpoint can verify that the message is intact.

Further, the system can be employed to facilitate secure dialog with minimal performance overhead when compared with conventional system(s). Optionally, the system can facilitate load balancing (e.g., among deployed instances of a service). In this example, secured dialogs to a service can be location transparent so that a dialog targeted to a service can be able to talk to any instance of the same service transparently without any additional security setup.

The system employs both public key/private key asymmetric encryption technique(s) and symmetric encryption technique(s) to authenticate and secure information exchanged between an initiator system and a target system.

The system includes a service pair encryption component that employs an initiator private key to encrypt authentication information and a key exchange key encryption component that employs a target public key to encrypt a key exchange key. The system further includes a dialog session key encryption component that employs the key exchange key to encrypt a dialog session key and a message body encryption component that employs the dialog session key to encrypt a message body. Additionally, the system includes a message generator that provides an encrypted message based, at least in part, upon the encrypted authentication information, the encrypted key exchange key, the encrypted dialog session key and the encrypted message body.

As noted previously, the key exchange key can be a per service pair (e.g., initiator and target) symmetric key that allows dialogs between two endpoints to skip the per dialog session key decryption operation, as well as the per message signature verification operation. In one example, a particular key exchange key can be employed by a service pair for substantially all dialog(s) between them.

Thus, the key exchange key can serve as a level of indirection between an authentication header and the dialog session key. For example, the key exchange key can be encrypted with the target public key and can be sent as part of a key exchange key header in message(s) exchanged between the two services. The key exchange key can further be employed to encrypt the dialog session key.

A dialog session key can be a symmetric key (e.g., randomly generated). The dialog session key can be employed, for example, to encrypt and/or decrypt message(s) that form a dialog between an initiator system and a target system. Conventional messaging system have employed public/private pair asymmetric encryption which are orders of magnitude more computationally expensive to perform compared to symmetric key operations employed with the dialog session key.

In one example, for security reasons, the per dialog session key generally is not shared among dialogs between the same two service. If the per dialog session key is shared, once an unauthorized entity (e.g., attacker) obtains the dialog session key, the unauthorized entity will be able to decrypt messages in the dialogs encrypted with the compromised dialog session key.

Another aspect of the present invention provides for an exemplary secure message structure comprising a security preamble, a service pair secure header, a key exchange key header, a dialog session key and a message body. The security preamble can include information general security information (e.g., version information, message integrity check, time the message created and/or encryption salt). The service pair security header is used to securely convey authentication information (e.g., certificate name of the initiating service, date the certificate was certified, certificate name of the target service, date the target service's certificate was issued and/or signature). The key exchange key header is used to securely convey the key exchange key. In one example, key exchange key header includes a key exchange key identifier and the encrypted key exchange key.

Optionally, the key exchange key header can be persisted in the dialog endpoint tables (e.g., for the life of the dialog), and, can further be identified by a globally unique identifier (GUID) sent with a message. In this example, the key exchange key header includes a key exchange key ID associated with the GUID. The GUID can be checked before the key exchange key is used in case the key exchange key has been changed by the initiator of the message. The key exchange key is encrypted with the target public key.

The dialog session key header can include, for example, a dialog session key identifier and an encrypted dialog session key. The dialog session key is encrypted with the key exchange key.

As with the key exchange key header, optionally, the dialog session key can be persisted in the dialog endpoint tables (e.g., for the life of the dialog), and, can further be identified by a GUID sent with a message. The GUID can be checked before the dialog session key is used in case the dialog session key has been changed by the initiator of the message. The message body is encrypted with the dialog session key.

Yet another aspect of the present invention provides for a secure message receiver system. The system includes a message receiver that receives an encrypted message and a service pair encryption component that employs an initiator public key to decrypt authentication information of the encrypted message. The system further includes a key exchange key decryption component that employs a target private key to decrypt a key exchange key of the encrypted message, if the key exchange key is not stored in a cache. Additionally, the system includes a dialog session key decryption component that employs the key exchange key to decrypt a dialog session key of the encrypted message, if the dialog session key is not stored in the cache. Further, the system includes a message body decryption component that employs the dialog session key to decrypt a message body of the encrypted message.

Another aspect of the present invention provides for caching of message header(s) to reduce processing time. For example, the message receiver can determine whether the service pair security header, the key exchange key header and/or the dialog session key header has cached. If they are cached, the processing of these headers can be skipped and the decrypted dialog session key can be employed to decrypt the received message. Thus, the system(s) of the present invention can facilitate flexibility in caching as the system(s) can work properly even when no header(s) and/or key(s) are cached.

In one example, to maximize performance gains, both the "per service pair" key exchange key and the "per dialog" dialog session key are cached (e.g., at each endpoint of the dialog). However, each message comprises sufficient information to derive the key exchange key and the dialog session key. Thus, in the event that an endpoint chooses not to cache one or both of these keys, the message can be decrypted as noted previously. This allows the endpoints total freedom in deciding how much resource it desires to devote to caching, or even whether it wants to devote any resource to caching at all.

Another aspect of the present invention facilitates dynamic rerouting of secured dialog. The system(s) can further allow a secure dialog to be directed to any instance of a service without any additional security setup. For example, message(s) initially targeting an instance of a service can be redirected to another instance of that service midway through the dialog.

The ability for dialogs to be rerouted midway is especially important for graceful failover through database mirroring. If a service is mirrored on two databases, and the principal database fails, messages can be rerouted to the mirrored service and processing can continue without interruption from the point where the failure occurred.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
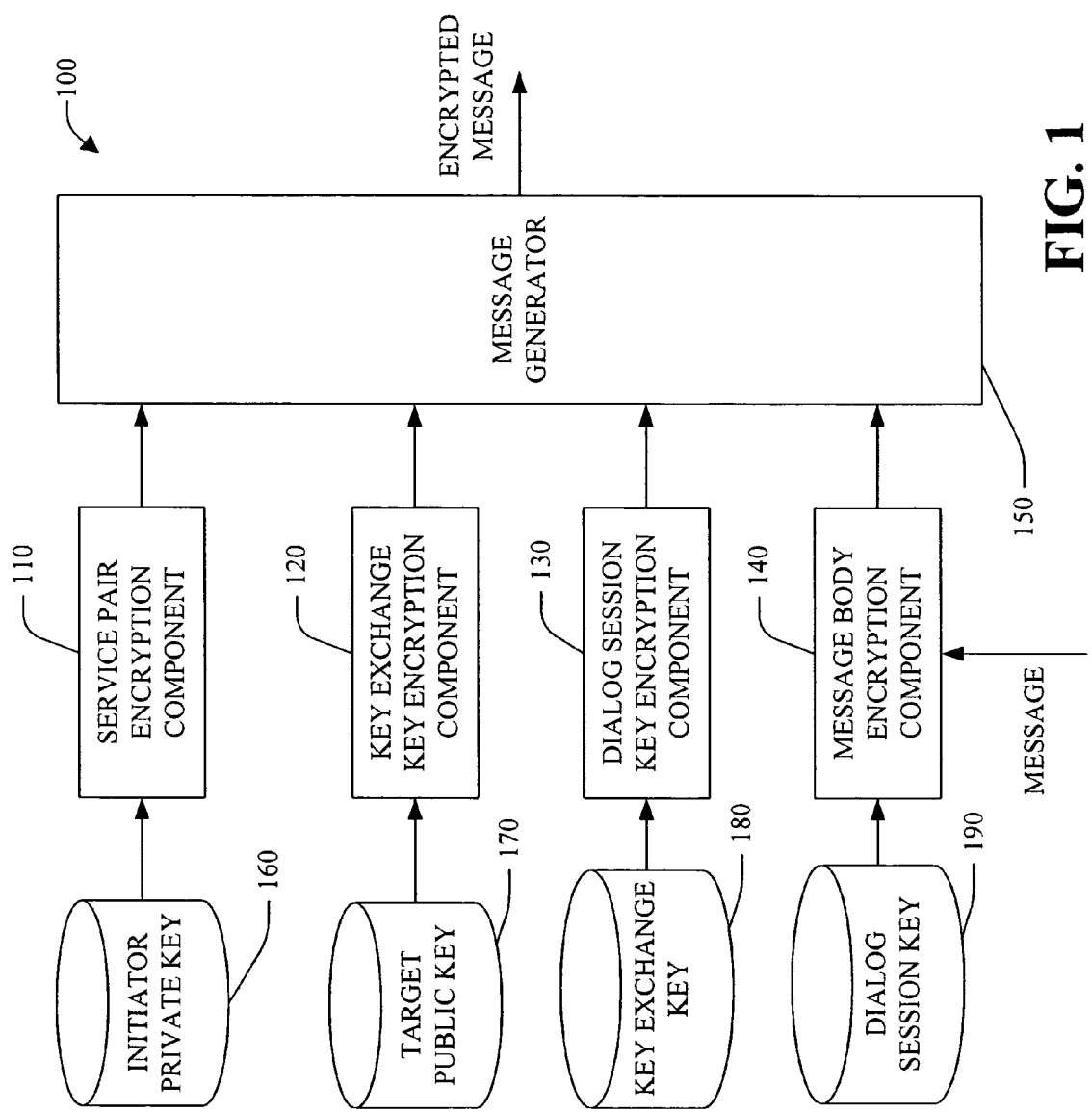
FIG. 1 is a block diagram of a secure message generation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

"Dialog" refers to a single bidirectional streams of messages between two endpoints (e.g., initiator system and target system(s)). For example, two endpoints can have zero, one or more dialog(s) ongoing at any particular time. In one example, all messages in a dialog are ordered and dialog messages are always delivered in the order sent. The order is maintained across transactions, across input threads, across output threads, and across crashes and restarts. Further, a "message" can include a conversation handle that uniquely identifies the dialog associated with it. For example, an order entry application can have dialogs open simultaneously with a shipping application, an inventory application and a billing application. Because messages from each application have a unique conversation handle, it's easy to tell which application sent each message.

Referring to FIG. 1, a secure message generation system 100 in accordance with an aspect of the present invention is illustrated. For example, the system 100 can be employed to facilitate a secure transfer of message(s) between two endpoints (not shown). The system 100 can facilitate end-to-end encryption of message data in a dialog. This means that the message data is encrypted at one dialog endpoint and not decrypted until it reaches the other dialog endpoint.

Additionally, the system 100 can further facilitate:

Dialog Authentication: One or both endpoints of a conversation can verify the authenticity of the other endpoint;

Authorization Access Control: Can be imposed on authenticated users to ensure that only authorized actions (send, receive and enqueue) can be performed; and/or, Message integrity check (MIC): A MIC that covers the message body as well as certain header(s) can be sent with a message so that the receiving endpoint can verify that the message is intact.

Accordingly, the system 100 can facilitate creation of dialog(s) as needed by the application developer. Thus, in one example, a programming model where a dialog is created for each unit of work required to accomplish a task is encouraged.

Additionally, the system 100 can be employed to facilitate secure dialog with minimal performance overhead when compared with conventional system(s). Optionally, the system 100 can facilitate load balancing (e.g., among deployed instances of a service). In this example, secured dialogs to a service can be location transparent so that a dialog targeted to a service can be able to talk to any instance of the same service transparently without any additional security setup.

The system 100 employs public key/private key asymmetric encryption technique(s) to authenticate and secure information (e.g., message(s) and/or session key(s)) exchanged between an initiator system (not shown) and a target system (not shown). Asymmetric encryption involves two digital keys—a public key and a private key. These keys have the useful property that something encrypted with the public key can only be decrypted with the private key and something encrypted with the private key can only be decrypted with the public key. As the names imply, the private key is a closely guarded secret that must be protected and the public key can be distributed to anybody. The system 100 further employs symmetric encryption. With symmetric encryption the same encryption key employed to encrypt a message is also employed to decrypt the message.

The system 100 includes a service pair encryption component 110, a key exchange key encryption component 120, a dialog session key encryption component 130, a message body encryption component 140 and a message generator 150. The system 100 can employ an initiator private key 160, a target public key 170, a key exchange key 180 and/or a dialog session key 190.

The initiator private key 160 is the private component of a public/private asymmetric pair associated with an initiator of a message. The target public key 170 is the public component of a public/private asymmetric pair associated with a target of the message.

A key exchange key 180 is a per service pair (e.g., initiator and target) symmetric key that allows dialogs between two endpoints to skip the per dialog session key decryption operation, as well as the per message signature verification operation. In one example, a particular key exchange key 180 can be employed by a service pair for substantially all dialog(s) between them.

The key exchange key 180 can serve as a level of indirection between an authentication header and the dialog session key 190. For example, the key exchange key 180 can be encrypted with the target public key 170 and can be sent as part of a key exchange key header (discussed below) in message(s) exchanged between the two services. The key exchange key 180 can further be employed to encrypt the dialog session key 190.

A dialog session key 190 can be a symmetric key (e.g., randomly generated by a session key generator (not shown)). The dialog session key 190 can be employed, for example, to encrypt and/or decrypt message(s) that form a dialog between an initiator system and a target system. Conventional messaging system have employed public/private pair asymmetric encryption which are orders of magnitude more computationally expensive to perform compared to symmetric key operations employed with the dialog session key 190.

For security reasons, the per dialog session key 190 generally is not shared among dialogs between the same two service. If the per dialog session key 190 is shared, once an unauthorized entity (e.g., attacker) obtains the dialog session key 190, the unauthorized entity will be able to decrypt messages in the dialogs encrypted with the compromised dialog session key 190.

In one example, each endpoint of a conversation generates a unique dialog session key 190 used in encrypting messages originating from that endpoint to the other endpoint. This allows the "dialog" dialog session key 190 to be updated by each endpoint independently without consulting with the other endpoint for example, as discussed in greater detail in co-pending U.S. utility application No. 10/824,162, filed on Apr. 14, 2004 and entitled "UNILATERAL SESSION KEY SHIFTING".

Figure 2:
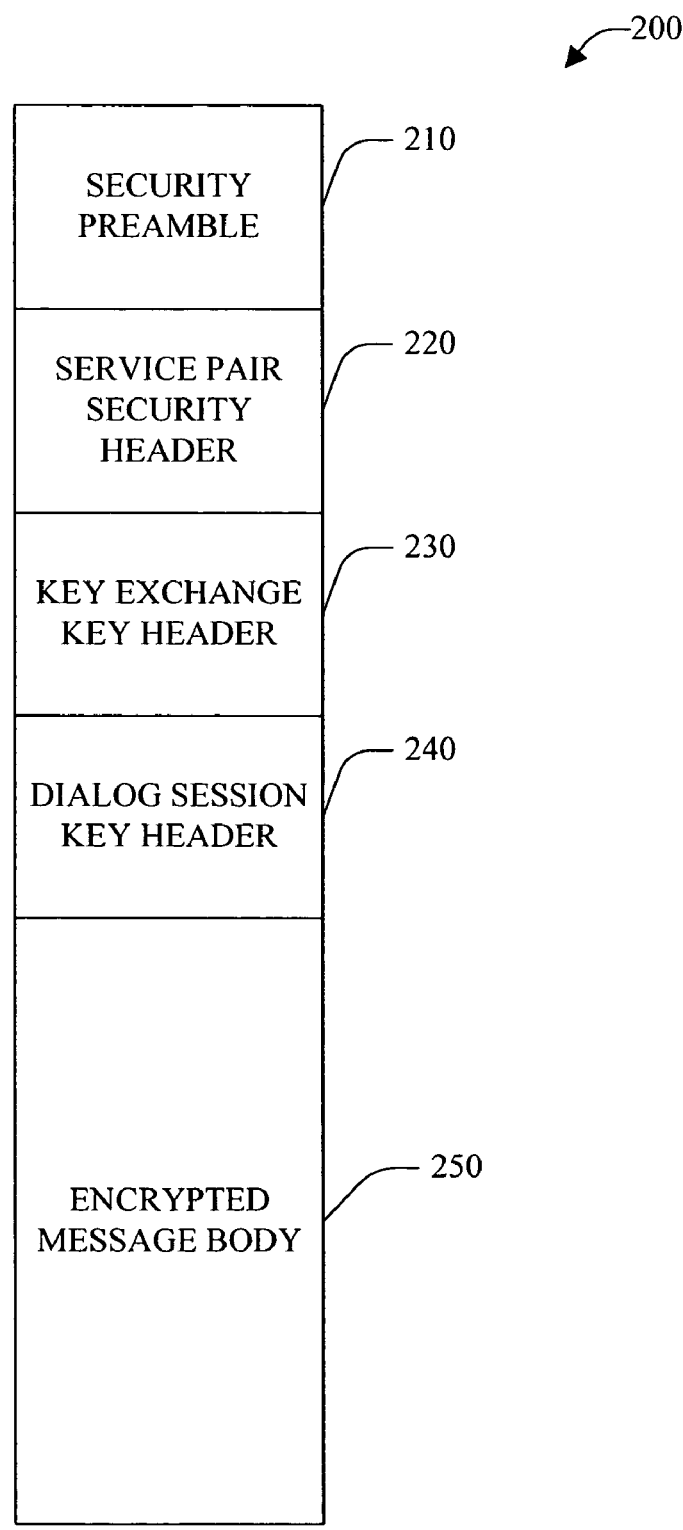
FIG. 2 is a block diagram of an exemplary secure message structure in accordance with an aspect of the present invention.

Referring briefly to FIG. 2, an exemplary secure message structure 200 in accordance with an aspect of the present invention is illustrated. The secure message structure 200 can include a security preamble 210, a service pair secure header 220, a key exchange key header 230, a dialog session key 240 and a message body 250.

Turning back, to FIG. 1, upon receipt of a message to be encrypted, the system 100 can provide a secure message based, for example, at least in part, upon the structure 200 as an output. In this example, the service pair encryption component 110 is responsible for generating the service pair security header 220; the key exchange key encryption component 120 is responsible for generating the key exchange key header 230; the dialog session key encryption component 130 is responsible for generating the dialog session key header 240; and, the message body encryption component 140 is responsible for generating the message body 250.

Security Preamble 210

The security preamble 210 can include information general security information. In one example, the security preamble 210 includes:

TABLE 1

| Field | Size (Bytes) | Usage |
|---|---|---|
| Version | 2 | Two byte version information. First byte is major and second byte is minor. |
| MIC | 16 | Message integrity check |
| Time | 4 | Absolute GMT time the message was created. |
| Salt | 16 | Encryption Salt value used for this message instance. |

In one example, the security preamble 210 is generated by the message generator 150.

Service Pair Security Header 220

The service pair security header 220 is used to securely convey authentication information. In one example, the fields in the service pair security header 220 include:

TABLE 2

| Field | Size (Bytes) | Usage |
|---|---|---|
| Initiator Cert Name | Nvarchar(512) | Certificate name of the initiating service (e.g., issuer name and serial number). |
| Initiator Cert Issue Date | Nvarchar(32) | Date the certificate was certified. |
| Target Cert Name | Nvarchar(512) | Certificate name of the target service (e.g., issuer name and serial number). |
| Target Cert | Nvarchar(32) | Date the target service's certificate |

TABLE 2-continued

| Field | Size (Bytes) | Usage |
|---|---|---|
| Issue Date | | was issued. |
| Signature | 16 | Signature over the dialog security header |

For example, the signature can be a one-way hash (e.g., MD5) of the previous fields encrypted with the initiator private key 160. The signature is checked to ensure the contents weren't altered in transit. The certificate issuer name and serial number identify the certificate used to authenticate the dialog connection. For example, this information can be used to look up the certificate (e.g., in a syscertificates meta-data table) so the certificate can be mapped to a user. This user can then used to perform authorization checks while processing the message.

The service pair security header 220 can be generated by the service pair encryption component 110 based, at least in part, upon the initiator private key 160.

Key Exchange Key Header 230

The key exchange key header 230 is used to securely convey a key exchange key 180. In one example, the key exchange key 180 is also a 128-bit symmetric key. For example, a service pair can have their own key exchange key 180 so that substantially all dialogs between the service pair employ the same key exchange key 180.

The key exchange key header 230 can include, for example:

TABLE 3

| Field | Size (Bytes) | Usage |
|---|---|---|
| key exchange key ID | 16 | Key exchange key ID |
| key exchange key | 16 | Encrypted key exchange key |

Optionally, the key exchange key 180 can be persisted in the dialog endpoint tables (e.g., for the life of the dialog), and, can further be identified by a GUID sent with a message. In this example, the key exchange key header 230 includes a key exchange key ID associated with the GUID. The GUID can be checked before the key exchange key 180 is used in case the key exchange key 180 has been changed by the initiator of the message. The key exchange key 180 is encrypted with the target public key 170 by the key exchange key encryption component 120.

Dialog Session Key Header 240

Messages are encrypted and the MIC is encrypted using the dialog session key 190 associated with the dialog. The dialog session key 190 can be generated and assigned an identifier (e.g., dialog key ID, for example, a GUID) by the dialog initiator.

For example:

TABLE 4

| Field | Size (Bytes) | Usage |
|---|---|---|
| Dialog key ID | 16 | Dialog session key ID |
| Dialog key | 16 | Encrypted dialog session key |

In one example, the dialog session key 190 is a 128-bit symmetric key which is used for a dialog (e.g., one-way). A complete dialog uses two dialog session keys 190-one for messages going each direction.

Optionally, the dialog session key 190 can be persisted in the dialog endpoint tables (e.g., for the life of the dialog), and, can further be identified by a GUID sent with a message. The GUID can be checked before the dialog session key is used in case the dialog session key has been changed by the initiator of the message.

Since the dialog session key 190 is sent in the message header, it must be encrypted. In accordance with an aspect of the present invention, instead of encrypting it with a private key which is a computationally expensive operation, the dialog session key 190 is encrypted with the key exchange key 180.

Message Body 250

Data integrity and privacy are provided for dialog messages by computing a Message Integrity Check (MIC) on message and header data and by encrypting the message body. For example, encryption and MIC checking can be performed by the message body encryption component 140 (e.g., in the Transport layer).

In one example, the MIC is computed using a one-way hash algorithm (e.g., MD5) over the message body and the header fields which don't change as the message is routed to its target. This hash is encrypted with the dialog session key 190 and put into the message header so it can be checked at the message target to ensure the data didn't change in transit.

After the MIC is computed on the message body, the message contents are encrypted (e.g., using an RC2 algorithm) with the dialog session key 190. For example, when the message arrives at its final target, it is decrypted with the dialog session key 190 before it is placed into a message queue associated with the target.

Use of Key Exchange Key 180

A key exchange key 180 that can be reused across multiple dialogs between two services eliminates the need for a service to perform the costly public key operation for every dialog.

For example, when the initiator begins a second dialog can use the service pair header 220 and the key exchange key header 230 that were computed for the first dialog. When the target receives the message, it notices that it already cached the key exchange key 180 and can go ahead and decrypt the "per dialog" dialog session key 190. It can than use the dialog session key 190 to decrypt the messages sent by the initiator as well as verify its MIC.

In one example, the dialog session key 190 is a 128-bit symmetric key which is used for a dialog in one direction—a complete dialog uses two dialog session keys 190—one for messages going each direction. In this example, if the dialog session key 190 is employed for message(s) going in only one direction, the only thing the target needs to create for each dialog is the "per dialog" dialog session key header 240 for messages that go from the target to the initiator. This includes generation of the dialog session key 190 and encryption of the dialog session key 190 with the key exchange key 180. Significantly, in this example, new dialog (s) between actively communicating services involve no public key operations, thus allowing secure dialog(s) to be created with minimal overhead.

It is to be appreciated that the system 100, the service pair encryption component 110, the key exchange key encryption component 120, the dialog session key encryption component 130, the message body encryption component 140 and/or the message generator 150 can be computer components as that term is defined herein.

Figure 3:
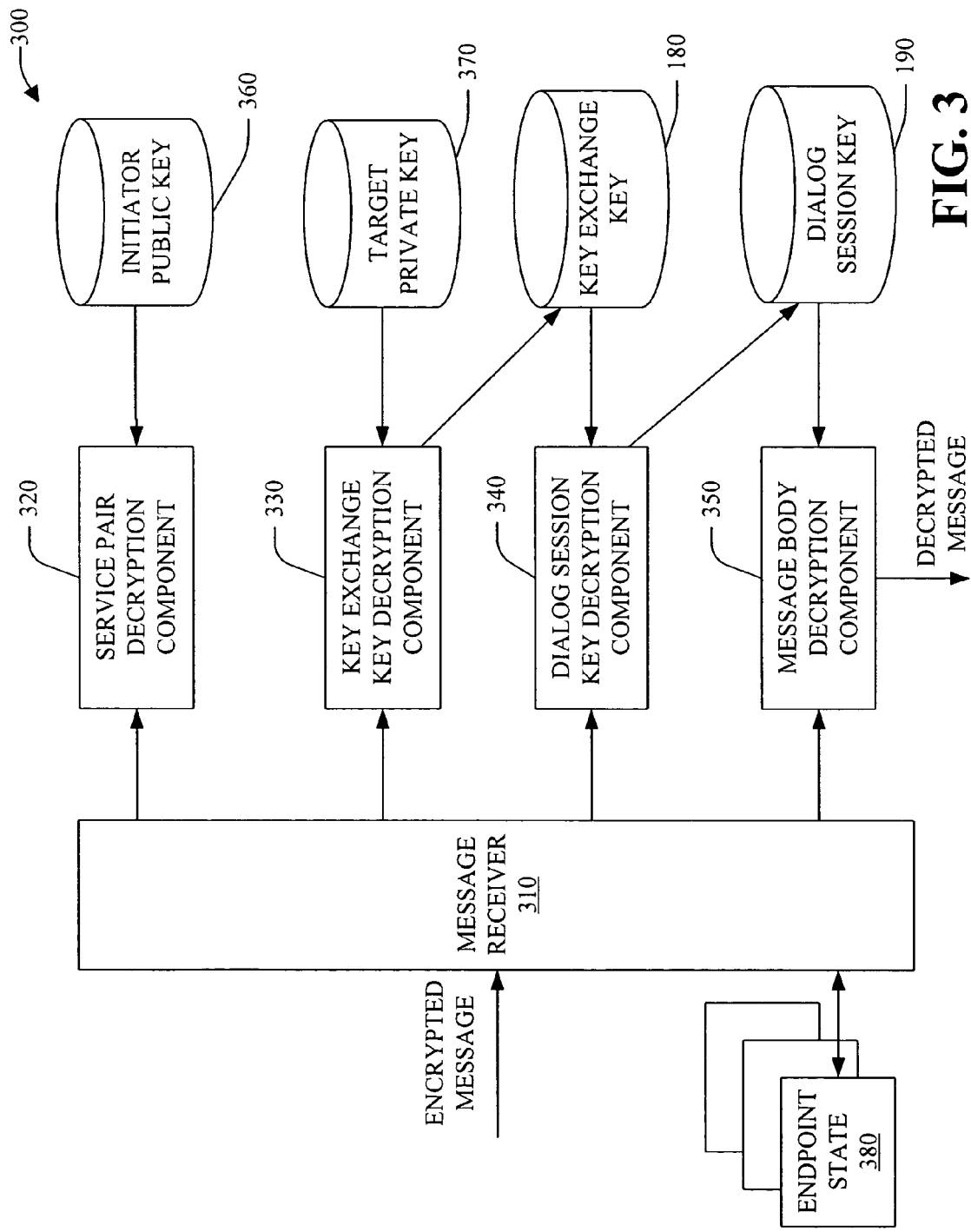
FIG. 3 is a block diagram of a secure message receiver system in accordance with an aspect of the present invention.

Next, turning to FIG. 3, a secure message receiver system 300 in accordance with an aspect of the present invention is illustrated. The system 300 includes a message receiver 310 that receives encrypted messages, for example, from a message generation system 100. The system 300 further includes a service pair decryption component 320, a key exchange key decryption component 330, a dialog session key decryption component 340 and a message body decryption component 350.

The message receiver 310 receives the encrypted message and validates the security preamble 210. Thereafter, the message receiver 310 provides appropriate parts of the message to components of the system 300. For example, the message receiver can provide the service pair security header 220 to the service pair decryption component 320; the key exchange key header 230 to the key exchange key decryption component 330, the dialog session key header 240 to the dialog session key decryption component 340; and, the message body 250 to the message body decryption component 350.

The service pair decryption component 320 can employ an initiator public key 360 to decrypt information associated with the service pair security header 220, for example, to verify authentication information (e.g., as set forth in Table 2 above). For example, the service pair decryption component 320 can employ a signature of the service pair security header 220 to ensure that contents of the encrypted message were not altered in transit. The service pair decryption component 320 can further employ a certificate issuer name and serial number that identify the certificate used to authenticate the dialog connection (e.g., initiator and/or target). For example, this information can be used to look up the certificate (e.g., in a syscertificates meta-data table) so the certificate can be mapped to a user which can be employed to perform authorization checks. The service pair decryption component 320 can, optionally, cache one or more service pair security headers 220, for example, to reduce message decryption processing time.

The key exchange key decryption component 330 can employ a target private key 370 to decrypt the key exchange key 180 encrypted in the key exchange key header 230. The key exchange key decryption component 330 can store the key exchange key 180 for use by the dialog session key decryption component 340. The key exchange key decryption component 330 can, optionally, cache one or more key exchange key headers 230, for example, to further reduce message decryption processing time.

The dialog session key decryption component 340 can employ the key exchange key 180 to decrypt the dialog session key 190 encrypted in the dialog session key header 240. The dialog session key decryption component 340 can store the dialog session key 190 for use by the message body decryption component 350. The dialog session key decryption component 340 can, optionally, cache one or more dialog session key headers 240, to even further reduce message decryption processing time.

The message body decryption component 350 can employ the dialog session key 190 to decrypt the message body 250. The message body decryption component 350 can provide a decrypted message as an output.

Processing of Initial Message of a Dialog from a Given Source

In this example, the first time a system 300 (e.g., associated with a target endpoint) receives an encrypted message from a given source (e.g., initiator), the key exchange key decryption component 330 decrypts the key exchange key 180 and caches the key exchange key 180 and its associated key ID. The key exchange key 180 is then employed by the dialog session key decryption component 340 to decrypt the dialog session key 190 for the dialog.

Processing of Initial Message of a Dialog from a Known Source

When a dialog is started, the key exchange key ID in the key exchange key header can be checked against the cache of key exchange keys and associated key exchange key IDs. If the key exchange key ID is found, the key exchange key can be used without performance of the key exchange key decryption using the target private key 370.

Checking the key exchange key ID on dialog creation allows the key exchange key 180 to be changed at any time. In this example, the key exchange key 180 is cached in memory so if the database is restarted, it will be obtained from the next dialog initiation message it receives.

Exemplary Processing of Message(s) by System 300

In this example, when the system 300 receives a message sent on a secure dialog, the system 300 can perform the following to decrypt the message. The message receiver 310 can determine whether a dialog endpoint state 380 associated with the dialog exists. If the endpoint state 380 is not found, then the received message is the first one received for this dialog. Accordingly, a dialog endpoint 380 is created.

The dialog endpoint state 380 can store information associated with the state of a dialog including, for example, the current dialog session key 190 associated with the dialog.

The message receiver 310 can further determine whether the service pair security header 220, the key exchange key header 230 and the dialog session key header 240 is cached. If they are cached, the processing of these headers 220, 230, 240 can be skipped and the decrypted dialog session key 190 can be employed to decrypt the received message.

If the service pair security header 220, the key exchange key header or the dialog session key header 240 is not cached, the header(s) that were cached can be validated and the appropriate key(s) (e.g., key exchange key 180 and/or dialog session key 190) can be decrypted. Optionally, if the validation is successful, the system 300 can determine a database user identity based, at least in part, upon the initiator' certificate information of the service pair security header 220.

Once the headers have been validated and the security information is available, the dialog endpoint state is updated with this new information. In addition, the service pair security header 220, the key exchange header 230 and/or the dialog session key header 240 can be added to the cache.

Optionally, the context user can be set to the database user mapped to the sender's certificate. A check can further be performed to determine whether this user has permission to enqueue to the service's queue or not. If not, the message is discarded.

Total Caching Flexibility

The system 100 and/or the system 300 can allow total flexibility in caching as the system 100 and/or the system 300 can work properly even when no header(s) and/or key(s) are cached. As noted above, the service pair security header 220, the key exchange key header 230 and/or the dialog session key header 240 can be cached to facilitate performance enhancements.

In one example, to maximize performance gains, both the "per service pair" key exchange key 180 and the "per dialog" dialog session key are cached (e.g., at each endpoint of the dialog). However, each message comprises sufficient information to derive the key exchange key 180 and the dialog session key 190. Thus, in the event that an endpoint chooses not to cache one or both of these keys, the message can be decrypted as noted previously. This allows the endpoints total freedom in deciding how much resource it desires to devote to caching, or even whether it wants to devote any resource to caching at all.

Dynamic Rerouting of Secured Dialog

The system 100 and/or the system 300 allow a secure dialog to be directed to any instance of a service without any additional security setup. For example, message(s) initially targeting an instance of a service can be redirected to another instance of that service midway through the dialog. Thus, if an instance of a service fails, messages destined for that service can be transparently rerouted to other instances of that service.

The ability for dialogs to be rerouted midway is especially important for graceful failover through database mirroring. If a service is mirrored on two databases, and the principal database fails, messages can be rerouted to the mirrored service and processing can continue without interruption from the point where the failure occurred.

For example, if the first three messages were already processed at the principal when the dialog failed, the mirror can simply go through the steps necessary to derive the key exchange key 180 and dialog session key 190, and use the dialog session key 190 to decrypt subsequent messages in the dialog.

In this example, the system 100 and/or the system 300 are able to facilitate dynamic rerouting of secured dialogs as:
  A service is only addressable by name and not by its physical address;
  Instances of the same service share the same private/public key pair; and,
  Information required to derive the "per service pair key" exchange key 180 and the "per dialog" dialog session key 190 are embedded in each message header.

It is to be appreciated that the system 300, message receiver 310, the service pair decryption component 320, the key exchange key decryption component 330, the dialog session key decryption component 340, the message body decryption component 350, the initiator public key, the target private key 370 and/or the endpoint state 380 can be computer components as that term is defined herein.

Turning briefly to FIGS. 4, 5, 6 and 7, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
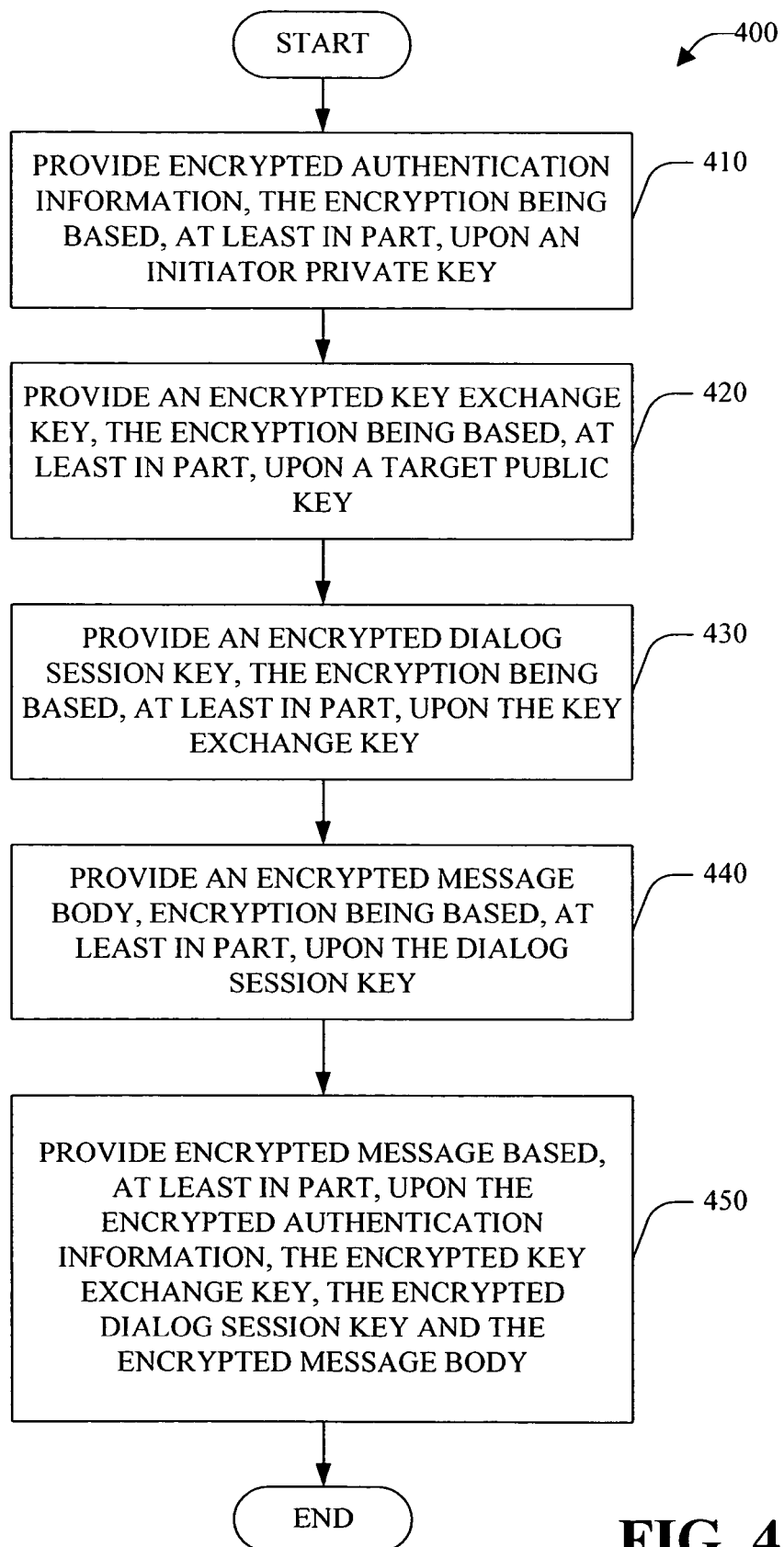
FIG. 4 is a flow chart of a method facilitating secure message generation in accordance with an aspect of the present invention.

Referring to FIG. 4, a method 400 facilitating secure message generation in accordance with an aspect of the present invention is illustrated. At 410, encrypted authentication information, encryption being based, at least in part, upon an initiator private key is provided (e.g., by a service pair encryption component 110). At 420, an encrypted key exchange key, the encryption being based, at least in part, upon a target public key, is provided (e.g., by a key exchange key encryption component 120).

At 430, an encrypted dialog session key, the encryption being based, at least in part, upon the key exchange key, is provided (e.g., by a dialog session key encryption component 130). At 440, an encrypted message body, encryption being based, at least in part, upon the dialog session key, is provided (e.g., by a message body encryption component 140).

Figure 5:
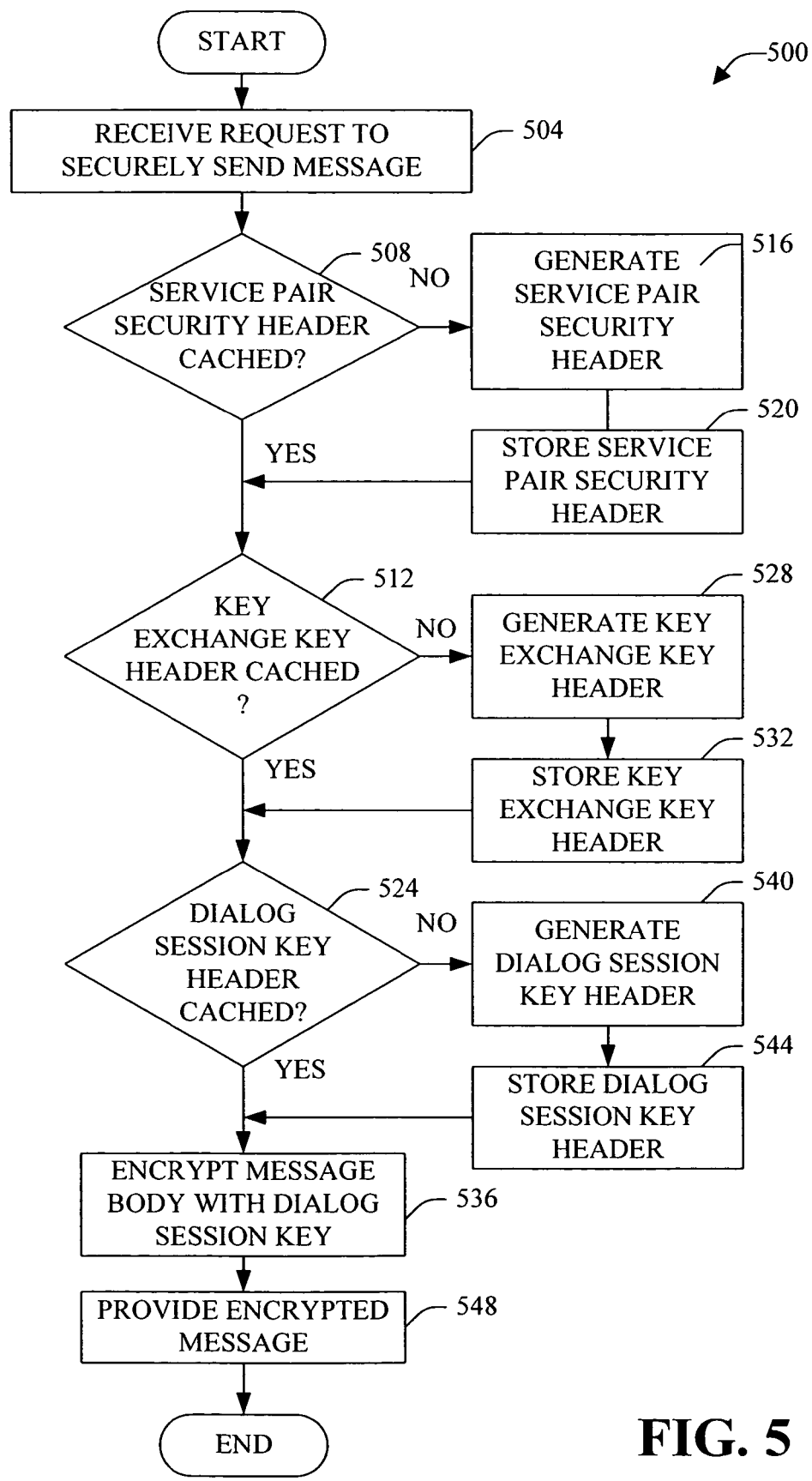
FIG. 5 is a flow chart of a method facilitating secure message generation in accordance with an aspect of the present invention.

Next, referring to FIG. 5, a method 500 facilitating secure message generation in accordance with an aspect of the present invention is illustrated. At 504, a request to securely send a message is received (e.g., by a message generator 150).

At 508, a determination is made as to whether a service pair security header associated with the message to be sent has been cached. If the determination at 508 is YES, processing continues at 512. If the determination at 508 is NO, at 516, a service pair secure header is generated. At 520, the service pair security header is stored (e.g., cached), and, processing continues at 512.

At 512, a determination is made as to whether a key exchange key header associated with the message to be sent has been cached. If the determination at 512 is YES, processing continues at 524. If the determination at 512 is NO, at 528, a key exchange key header is generated. At 532, the key exchange header is stored (e.g., cached), and, processing continues at 524.

At 524, a determination is made as to whether a dialog session key header associated with the message to be sent has been cached. If the determination at 524 is YES, processing continues at 536. If the determination at 524 is NO, at 540, a dialog session key header associated is generated. At 544, the dialog session key header is stored (e.g., cached), and, processing continues at 536.

At 536, a message body of the message to be sent is encrypted with the dialog session key. At 548, the encrypted message is provided, and, no further processing occurs.

Figure 6:
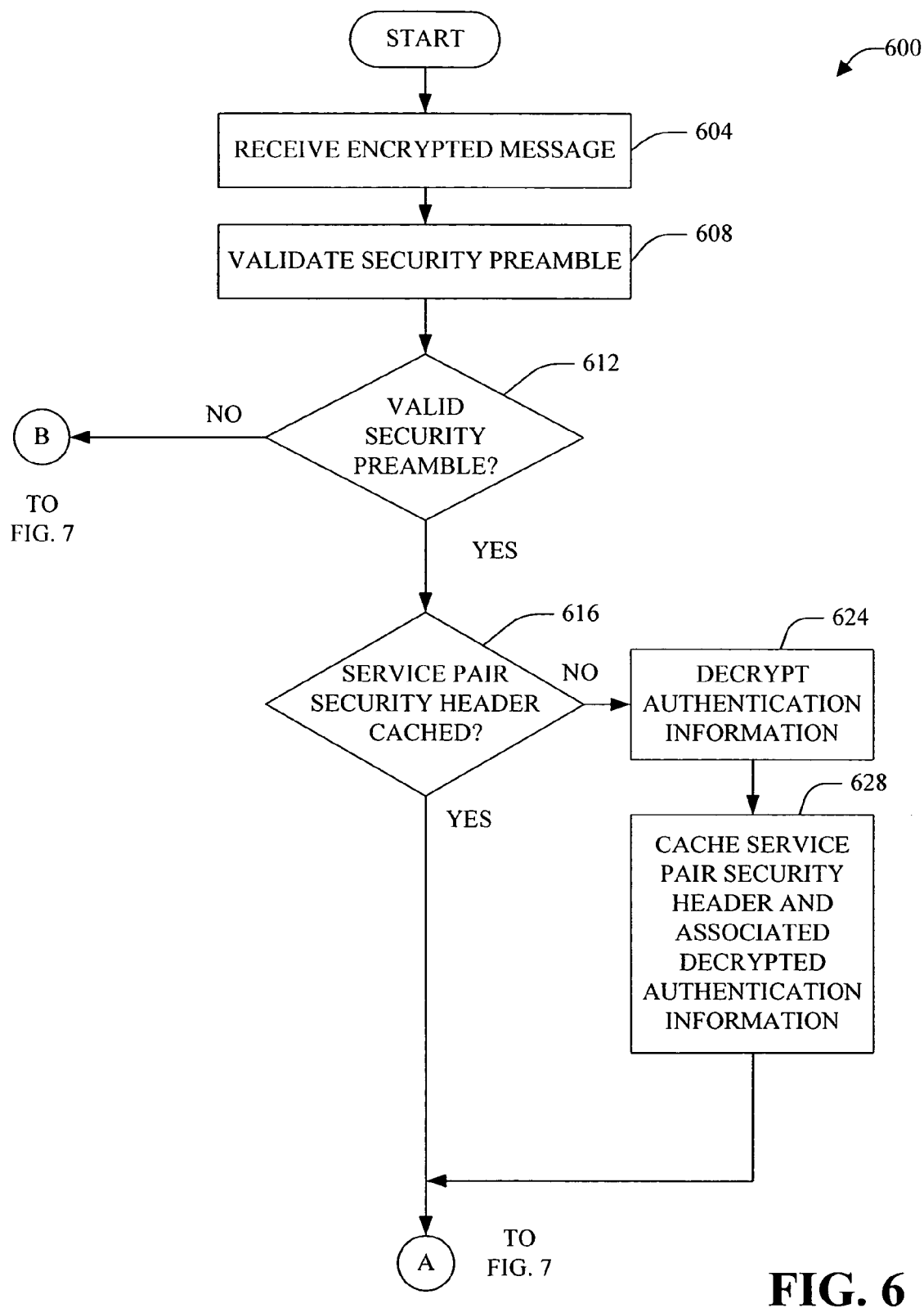
FIG. 6 is a flow chart of a method of receiving a secure message in accordance with an aspect of the present invention.
Figure 7:
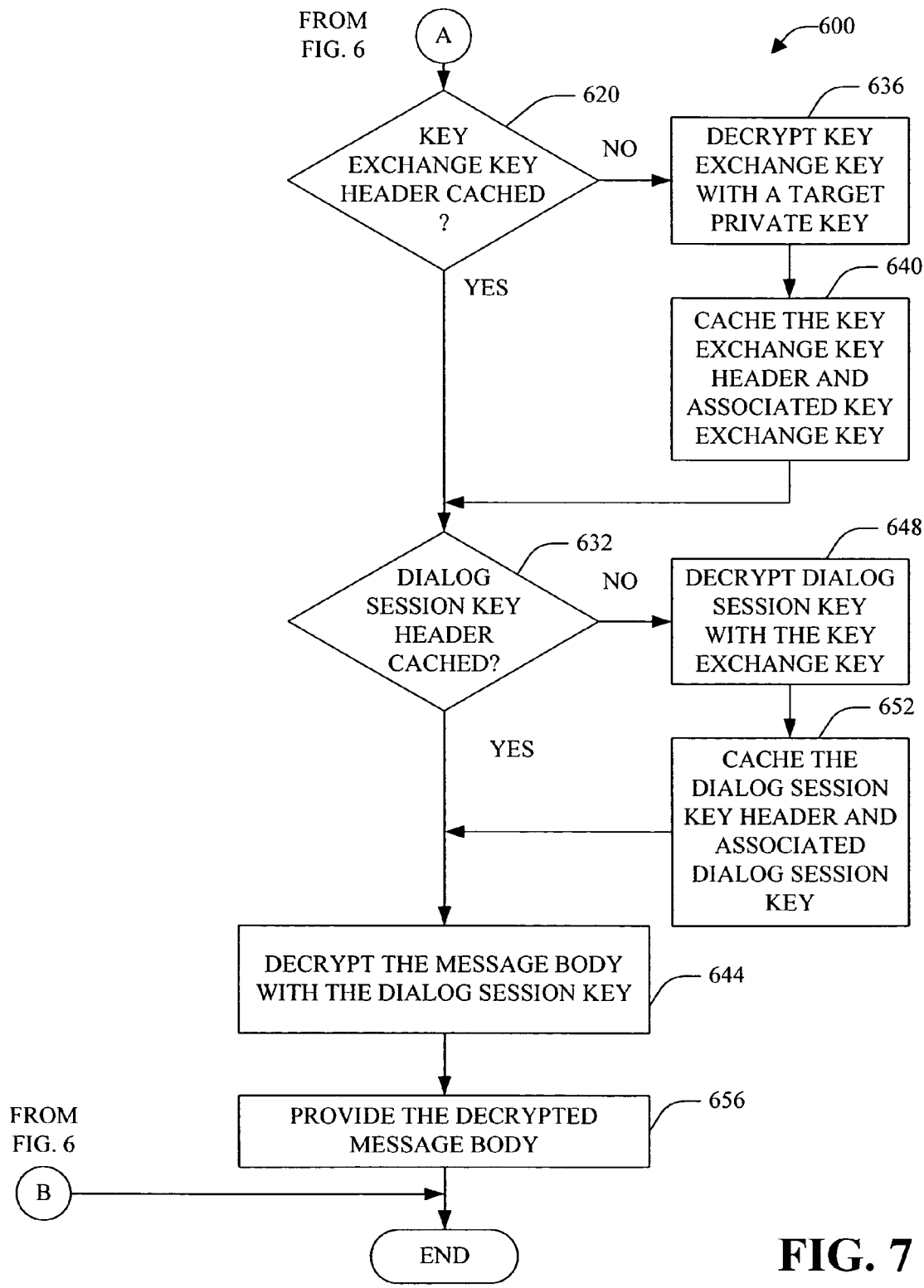
FIG. 7 is a flow chart further illustrating the method of FIG. 6 in accordance with an aspect of the present invention.

Turning to FIGS. 6 and 7, a method 600 of receiving a secure message in accordance with an aspect of the present invention is illustrated. At 604, an encrypted message is received. At 608, a security preamble of the encrypted message is validated. At 612, a determination is made as to whether the security preamble is valid. If the determination at 612 is NO, no further processing occurs.

If the determination at 612 is YES, at 616, a determination is made as to whether a service pair header is cached. If the determination at 616 is YES, processing continues at 620. If the determination at 616 is NO, at 624, authentication information is decrypted (e.g., with an initiator public key). At 628, the service pair security header and associated decrypted authentication information are cached, and, processing continues at 624.

At 624, a determination is made as to whether a key exchange key header is cached. If the determination at 620 is YES, processing continues at 632. If the determination at 620 is NO, at 636, a key exchange key is decrypted with a target private key. At 640, the key exchange key header and associated key exchange key are cached, and, processing continues at 632.

At 632, a determination is made as to whether a dialog session key header is cached. If the determination at 632 is YES, processing continues at 644. If the determination at 644 is NO, at 648, a dialog session key is decrypted with the key exchange key. At 652, the dialog session key header and associated dialog session key are cached, and, processing continues at 644.

At 644, the message body is decrypted with the dialog session key. At 656, the decrypted message body is provided, and, no further processing occurs.

Figure 8:
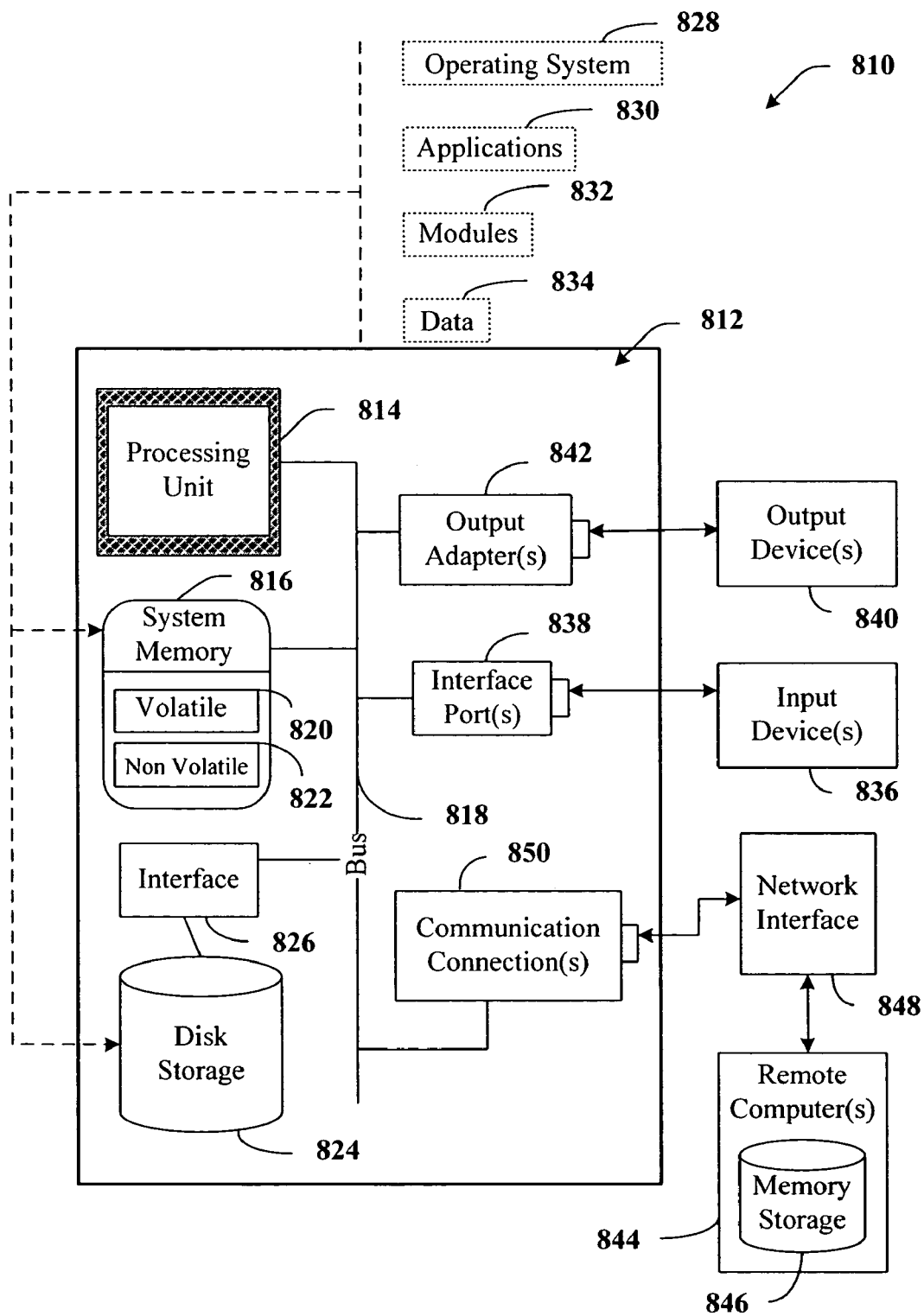
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A secure message generation system embodied on a computer readable storage medium comprising:
   a service pair encryption component that employs an initiator private key to encrypt authentication information;
   a key exchange key encryption component that employs a target public key to encrypt a key exchange key;
   a dialog session key encryption component that employs the key exchange key to encrypt a dialog session key;
   a message body encryption component that employs the dialog session key to encrypt a message body; and,
   a message generator that generates an encrypted message based, at least in part, upon the encrypted authentication information, the encrypted key exchange key, the encrypted dialog session key and the encrypted message body, wherein the encrypted message is at least one of stored on a computer readable storage medium, displayed on a display device, employed by one or more processes executed on one or more processors, or transmitted between two or more processes executing on one or more processors.

2. The system of claim 1, the message generator generates a security preamble of the encrypted message.

3. The system of claim 2, the security preamble comprising at least one of a version information field, a message integrity check information field, a time associated with creation of the message field and an encryption salt value used for the message field.

4. The system of claim 1, the service pair encryption component generates a service pair security header of the encrypted message based, at least in part, upon the initiator private key.

5. The system of claim 4, the service pair security header comprising at least one of an initiator certificate name field, an initiator certificate issue date field, a target certificate name field, a target certificate name field and a signature field.

6. The system of claim 5, the signature field comprising a one-way hash of the initiator certificate name field, the initiator certificate issue date field, the target certificate name field and the target certificate name field encrypted with the initiator private key.

7. The system of claim 1, the key exchange key encryption component generates a key exchange key header of the encrypted message based, at least in part, upon the target public key.

8. The system of claim 7, the key exchange key header comprising a key exchange key identifier and an encrypted key exchange key.

9. The system of claim 7, the key exchange key comprising a symmetric key.

10. The system of claim 9, the key exchange key comprising a 128-bit symmetric key.

11. The system of claim 1, the key exchange key uniquely assigned to an initiator and a target pair.

12. The system of claim 11, messages exchanged between the initiator and target pair being based, at least in part, upon the unique key exchange key.

13. The system of claim 1, the dialog session key encryption component generates a dialog session key header of the encrypted message based, at least in part, upon the key exchange key.

14. The system of claim 13, the dialog session key header comprising a dialog session key identifier field and an encrypted dialog session key field.

15. The system of claim 1, the message body encryption component computes a message integrity check on message and header data.

16. The system of claim 15, the message integrity check is computed using a one-way hash algorithm.

17. A secure message receiver system embodied on a computer readable storage medium comprising:
a message receiver that receives an encrypted message;
a service pair encryption component that employs an initiator public key to decrypt authentication information of the encrypted message;
a key exchange key decryption component that employs a target private key to decrypt a key exchange key of the encrypted message, if the key exchange key is not stored in a cache;
a dialog session key decryption component that employs the key exchange key to decrypt a dialog session key of the encrypted message, if the dialog session key is not stored in the cache; and,
a message body decryption component that employs the decrypted or stored dialog session key to decrypt a message body of the encrypted message, wherein the decrypted message body is at least one of stored on a computer readable storage medium, displayed on a display device, employed by one or more processes executed on one or more processors, or transmitted between two or more processes executing on one or more processors.

18. The system of claim 17 further comprising the message receiver determines whether information associated with the key exchange key and/or the dialog session key have been cached based, at least in part, upon an endpoint state associated with a dialog.

19. The system of claim 17, the encrypted message comprising a service pair security header, a key exchange key header, a dialog session key header and a message body.

20. The system of claim 19, the service pair security header comprising at least one of an initiator certificate name field, an initiator certificate issue date field, a target certificate name field, a target certificate name field and a signature field.

21. The system of claim 19, the key exchange key header comprising a key exchange key identifier and an encrypted key exchange key.

22. The system of claim 19, the dialog session key header comprising a dialog session key identifier field and an encrypted dialog session key field.

23. The system of claim 17, the encrypted message further comprising a security preamble, the security preamble comprising at least one of a version information field, a message integrity check information field, a time associated with creation of the message field and an encryption salt value used for the message field.

24. The system of claim 17, the key exchange key uniquely assigned to an initiator and a target pair.

25. The system of claim 24, messages exchanged between the initiator and target pair being based, at least in part, upon the unique key exchange key.

26. A method facilitating secure message generation embodied on a computer readable storage medium comprising:
generating encrypted authentication information, the encryption being based, at least in part, upon an initiator private key;
generating an encrypted key exchange key, the encryption being based, at least in part, upon a target public key;
generating an encrypted dialog session key, the encryption being based, at least in part, upon the key exchange key; and,
generating an encrypted message body, encryption being based, at least in part, upon the dialog session key, wherein the encrypted message is at least one of stored on a computer readable storage medium, displayed on a display device, employed by one or more processes executed on one or more processors, or transmitted between two or more processes executing on one or more processors.

27. The method of claim 26 further comprising:
providing an encrypted message based, at least in part, upon the encrypted authentication information, the encrypted key exchange key, the encrypted dialog session key and the encrypted message body.

28. The method of claim 26, a service pair security header comprising the encrypted authentication information, a key exchange key header comprising the encrypted key exchange key, and, a dialog session key header comprising the encrypted dialog session key.

29. The method of claim 28, further comprising at least one of the following:
employing the initiator private key to encrypt authentication information, if the service pair security header is not cached;
employing the target public key to encrypt the key exchange key, if the key exchange key header is not cached; and,
employing the key exchange key to encrypt the dialog session key, if the dialog session key header it not cached.

30. A method of receiving a secure message comprising:
receiving an encrypted message; and, decrypting the encrypted message with a stored dialog session key, if a matching service pair security header, a matching key exchange key header and a matching dialog session key header associated with the encrypted message have been stored, wherein the decrypted message is at least one of stored on a computer readable storage medium, displayed on a display device, employed by one or more processes executed on one or more processors, or transmitted between two or more processes executing on one or more processors.

31. The method of claim 30, the service pair security header comprising encrypted authentication information, the key exchange key header comprising an encrypted key exchange key, and, the dialog session key header comprising an encrypted dialog session key.

32. The method of claim 31, further comprising at least one of the following:

decrypting authentication information, if the service pair security header is not cached, decryption being based, at least in part, upon an initiator public key;

decrypting the key exchange key, if the key exchange key header is not cached, decryption being based, at least in part, upon a target private key; and, decrypting the dialog session key, if the dialog session key header is not cached, decryption being based, at least in part, upon the key exchange key.

33. A computer readable medium having stored thereon computer executable instructions for carrying out the method of claim 30.

34. A data packet embodied on a computer readable storage medium that when transmitted between two or more computer components facilitates secure communication, the data packet comprising:

a key exchange key header comprising an assymetrically encrypted key exchange key;

a dialog session key header comprising a dialog session key encrypted with the key exchange key; and, a message body field comprising a message encrypted with the dialog session key.

* * * * *